United States Patent
Harris et al.

(10) Patent No.: US 11,981,290 B2
(45) Date of Patent: May 14, 2024

(54) INTEGRATED REMOVABLE BUMPER TRACTION DEVICES

(71) Applicant: TOYOTA MOTOR ENGINEERING & MANUFACTURING NORTH AMERICA, INC., Plano, TX (US)

(72) Inventors: Ryan C. Harris, Saline, MI (US); Scott L. Frederick, Brighton, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 285 days.

(21) Appl. No.: 17/345,507

(22) Filed: Jun. 11, 2021

(65) Prior Publication Data
US 2022/0396210 A1 Dec. 15, 2022

(51) Int. Cl.
*B60R 5/04* (2006.01)
*B60R 3/00* (2006.01)
*B60R 19/48* (2006.01)

(52) U.S. Cl.
CPC ............. *B60R 3/007* (2013.01); *B60R 5/04* (2013.01); *B60R 19/48* (2013.01)

(58) Field of Classification Search
CPC .. B60R 3/007; B60R 5/02; B60R 5/04; B60R 5/006; B60R 19/48; B60B 39/12
See application file for complete search history.

(56) References Cited

U.S. PATENT DOCUMENTS

| | | | | |
|---|---|---|---|---|
| 3,289,939 A | * | 12/1966 | Martinov | B60B 39/12 116/63 P |
| 3,614,136 A | * | 10/1971 | Dent | B60R 19/48 220/255 |
| 3,774,952 A | * | 11/1973 | Zorn | B60R 19/48 280/500 |
| 4,265,399 A | * | 5/1981 | Covington | B60B 39/12 238/14 |
| 4,534,508 A | * | 8/1985 | Willner, Jr. | B60B 39/12 224/558 |
| 4,570,986 A | * | 2/1986 | Sams | B60R 11/06 224/489 |
| 4,993,610 A | * | 2/1991 | Abretske | B62D 43/02 293/106 |
| 5,058,295 A | | 10/1991 | Holland | |
| 5,364,142 A | * | 11/1994 | Coiner | B60R 19/48 293/106 |
| 6,267,398 B1 | * | 7/2001 | Lombard | B60R 3/007 14/2.4 |
| 6,592,135 B2 | * | 7/2003 | Hendrix | B60R 3/002 14/71.1 |

(Continued)

*Primary Examiner* — Jeffrey J Restifo
(74) *Attorney, Agent, or Firm* — SHEPPARD, MULLIN, RICHTER & HAMPTON LLP; Hector A. Agdeppa; Daniel N. Yannuzzi

(57) ABSTRACT

A vehicle is provided with an integrated and removable traction device, such as a tread board. The traction device may be integrated into a bumper of the vehicle. When mounted/installed on the bumper, the traction device can act as a cover to a storage unit implemented in the bumper. When removed, the traction device can be placed under a wheel of the vehicle to provide increased traction on certain surfaces. By integrating the traction device into the vehicle's bumper area, the traction device need not occupy, e.g., interior storage space of the vehicle.

5 Claims, 5 Drawing Sheets

(56) References Cited

U.S. PATENT DOCUMENTS

| | | | | |
|---|---|---|---|---|
| 6,874,806 B1* | 4/2005 | Blake | ................... | B60D 1/605 |
| | | | | 280/507 |
| 7,708,294 B2* | 5/2010 | Demick | ................ | B60R 3/007 |
| | | | | 280/163 |
| 7,717,445 B2* | 5/2010 | Peterson | ................ | B60R 3/002 |
| | | | | 280/166 |
| 9,855,877 B2* | 1/2018 | Aftanas | ................... | B60R 3/007 |
| 10,179,486 B2 | 1/2019 | Théroux | | |
| 2008/0217077 A1* | 9/2008 | McCarthy | .............. | B60B 39/12 |
| | | | | 180/9 |
| 2016/0185273 A1* | 6/2016 | Aftanas | ................. | B65G 69/30 |
| | | | | 280/164.1 |
| 2017/0225509 A1 | 8/2017 | Blackshaw | | |
| 2018/0029416 A1* | 2/2018 | McCarthy | .............. | B60B 39/12 |
| 2018/0339552 A1* | 11/2018 | Hermans | ................. | B60C 27/00 |
| 2019/0126873 A1* | 5/2019 | Baker | .................... | B60Q 1/30 |
| 2019/0381842 A1 | 12/2019 | Parker | | |
| 2020/0231220 A1* | 7/2020 | Petty | ................... | B62D 25/184 |
| 2020/0307313 A1* | 10/2020 | Hadley | .................. | B60B 39/12 |
| 2021/0129758 A1* | 5/2021 | Wymore | .................. | B60D 1/52 |
| 2021/0339565 A1* | 11/2021 | Nommensen | .......... | B60B 39/12 |
| 2022/0073004 A1* | 3/2022 | Salter | ....................... | B60P 7/14 |
| 2022/0118914 A1* | 4/2022 | Weston | .................. | B60R 19/48 |
| 2022/0144173 A1* | 5/2022 | Spigner | ................... | B60D 1/58 |
| 2022/0396210 A1* | 12/2022 | Harris | .................... | B60R 19/48 |

\* cited by examiner

INTEGRATED REMOVABLE BUMPER TRACTION DEVICES

TECHNICAL FIELD

The present disclosure relates generally to vehicle traction devices, such as tread boards, and more particularly, to tread boards that are removably integrated into a vehicle, such as into a bumper of the vehicle.

DESCRIPTION OF RELATED ART

Vehicles, such as off-road trucks, sport utility vehicles (SUVs), or other types of vehicles may, from time to time, lose traction on a section(s) of roadway. Additionally, vehicles may be traveling in conditions that lead to loss of traction, e.g., traveling in snow, on sand, through mud, etc. In such situations, traction devices commonly referred to as "tread boards," "traction pads," "recovery boards," etc. may be used to provide additional/increased traction for vehicles in such situations. However, storage of such traction devices can be problematic.

BRIEF SUMMARY OF THE DISCLOSURE

In accordance with one embodiment, a vehicle may comprise a bumper, and a traction device integrated into the bumper. The traction device is stowable in the bumper and removable from the bumper. An attachment mechanism operatively connects the traction device to the bumper. The attachment mechanism may be adapted to retain the traction device within the bumper when stowed, and release the traction device from the bumper for use in providing traction to the vehicle.

In some embodiments, the bumper comprises a rear bumper of the vehicle.

In some embodiments, the bumper comprises a storage cavity.

In some embodiments, the traction device operates as a cover to the storage cavity when the traction device is stowed.

In some embodiments, the attachment mechanism comprises a latch having first and second ends distal from each other, the first end engaging with at least one of a surface of the traction device and a surface of the bumper, the second end engaging with at least one of a surface of the traction device and a surface of the bumper.

In accordance with another embodiment, a bumper comprises a lower back panel of a vehicle, and a bumper cover operatively connected to the lower back panel. A space between the bumper cover and the lower back panel comprises at least a portion of storage cavity, the cavity being covered by an integrated, removable traction device stored on the bumper.

In some embodiments, an attachment mechanism operatively connects the integrated, removable traction device to the bumper. The attachment mechanism can be adapted to retain the integrated, removable traction device within or atop the bumper cover when stowed, and release the traction device from the bumper cover for use in providing traction to the vehicle.

In some embodiments, the attachment mechanism comprises a latch having first and second ends distal from each other, the first end engaging with at least one of a surface of the traction device and a surface of the bumper, the second end engaging with at least one of a surface of the traction device and a surface of the bumper.

In accordance with another embodiment, a traction device may comprise an elongated platform, and a plurality of traction elements that are at least one of disposed on or integrated into the elongated platform. The traction device may further comprise at least one attachment mechanism integrated into the traction device. The at least one attachment mechanism operates to releasably secure the traction device to a bumper of a vehicle.

In some embodiments, the traction device comprises a cover for a storage cavity within the bumper of the vehicle.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

As noted above, road conditions, weather, location may result in a loss of traction when operating a vehicle. For example, customers/users may operate their vehicles, typically trucks or SUVs (but can be other vehicle types) "off-road" or "overland" in terrain with non-ideal traction conditions. When driving in these conditions, the need often arises for easily accessible tools to free the vehicle when it is stuck, e.g., in mud, snow, sand, etc. As also noted above, traction devices can be used in such situations.

Typically, traction devices, such as traction boards or mats can be placed ahead of/behind and under (to the extent possible) one or more tires that are slipping. However, the usual traction devices are not readily available for use, unless they are stored in/on a vehicle. Unfortunately, resorting to on/in-vehicle storage of conventional traction devices takes away (often) valuable space used to hold or carry/store other items or cargo. Even in the case of foldable traction mats, space is required to stow traction mats in their folded state.

Accordingly, various embodiments are directed to integrated, removable traction devices. Such traction devices may be integrated into or as part of a vehicle's bumper structure. Although not limited to this implementation, rear bumpers typically provide more room in which a traction device may be integrated, and therefore, in some embodiments, traction devices are configured to attach to a section(s) of the rear bumper. In this way, a user has ready access to a traction device (or multiple traction devices as will be described below). If/when a vehicle gets stuck or would be aided by additional traction or grip, a user can simply remove the traction device from the bumper, and put the traction device into use. Moreover, when not in use, the traction device need not take up space, e.g., in the vehicle cabin or other storage space/area, that might otherwise be used to carry/store other cargo.

Figure 1:
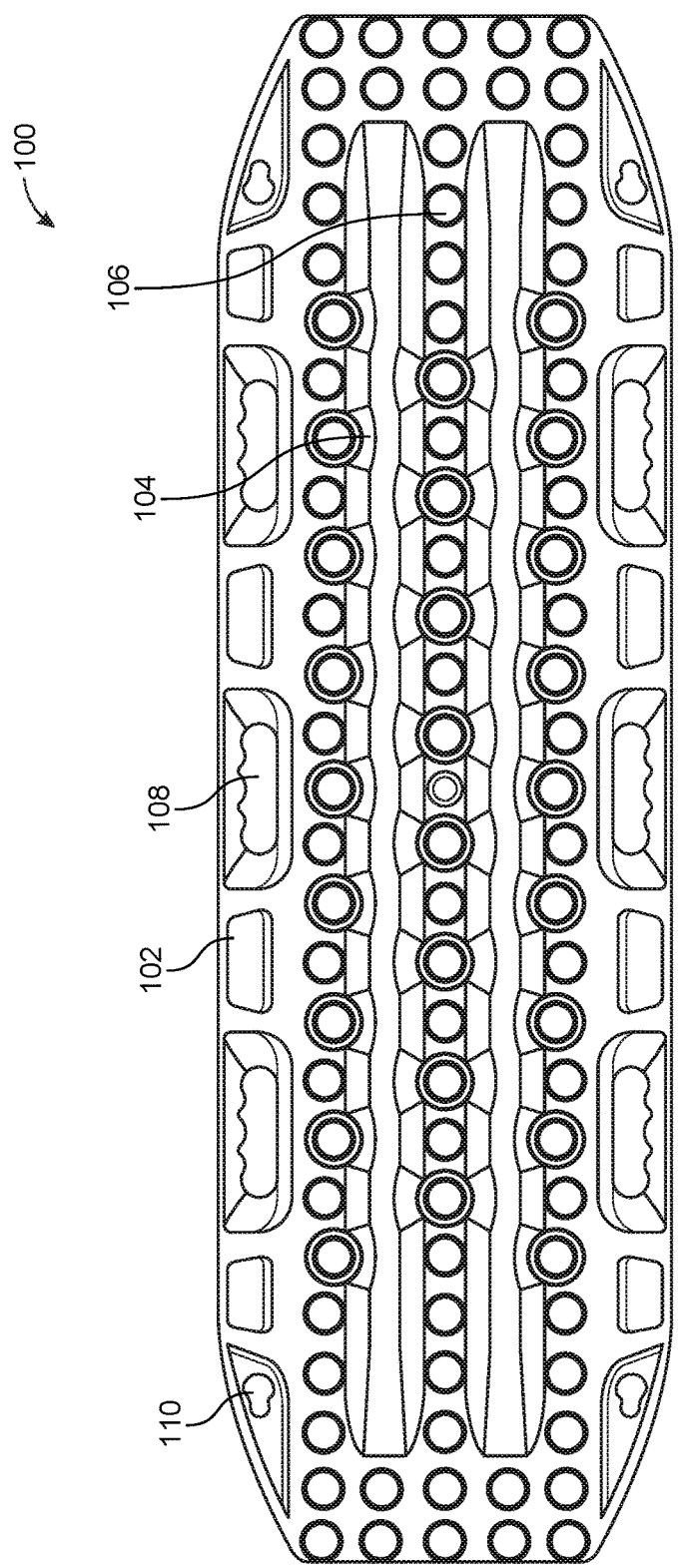
FIG. 1 illustrates an example traction device.

FIG. 1 illustrates an example of a traction device 100 in accordance with one embodiment. Traction device 100 may comprise a platform or surface(s) 102 atop or in which, traction teeth (one of which is labeled as 106) may be provided. In this particular embodiment, the traction teeth may be made of a metallic material (for structural integrity/strength), such as hard anodized aluminum. In other embodiments (not shown), traction can be provided by open apertures around which teeth or protrusions can be disposed. Other types of traction devices may use other traction-providing mechanisms or structures. For example, traction device 100 further includes two crevices or elongated/longitudinal cavities, one of which is labeled as cavity 104. Just like other types of traction-providing mechanisms may be used, the size, shape, or orientation of such elongated cavities can also vary. For example, traction devices can be configured or designed for use in specific conditions, with specific vehicles, or with specific tires.

Traction device 100 may further include one or more handles for a user to place, move or otherwise manipulate traction device 100 into a desired position, or to hold/manipulate traction device 100 for storage purposes. One such handle is labeled as handle 108.

Also included as part of traction device 100 are one or more attachment mechanisms. In this example, traction device 100 includes four attachment elements, in this instance, holes or cavities (one of which is labeled as 110) disposed at each corner of traction device 100. The number, size, shape, configuration of such attachment mechanisms can vary as will be described in greater detail below. In this example, it can be appreciated that a retaining member, such as a lock, clip, screw, bolt, catch, or other device/mechanism can be inserted into and through one or more of the attachment holes 110. The lock/clip/etc. can engage a corresponding mechanism or element within the bumper to which traction device 100 may be integrated to secure traction device 100 when not in use. To use traction device 100, a user may disengage the aforementioned attachment mechanisms and remove traction device from the bumper.

In other embodiments (not shown), the attachment mechanism 110 may be a part of traction device 100, rather than an hole or cavity for accepting another attachment element, e.g., retaining member. For example, locks, clips, catches, other retaining members, etc. may be manufactured as part of traction device 100 negating the need to use/keep track of separate screws, locks, bolts, clips, etc., and effectuate attachment by use/placement of such elements in/through a hole/cavity. Those of ordinary skill in the art would understand that many different mechanisms can be used to attach traction device 100 to a vehicle bumper.

In some embodiments, existing/conventional traction devices may be adapted to be integrated into vehicle bumpers configured to receive or mate with an integrated removable traction device. For example, consider traction device 100 to be a conventional traction device, where attachment holes 110 may be used to attach traction device 100 to a roof rack. In some embodiments, by providing a vehicle bumper that can accept traction device 100, traction device 100 can be stored in a manner that avoids the use of conventional cargo space. In other embodiments, traction device 100 may be specifically configured for use as an integrated, removable traction device that can be stowed as part of a vehicle's bumper.

Figure 2A:
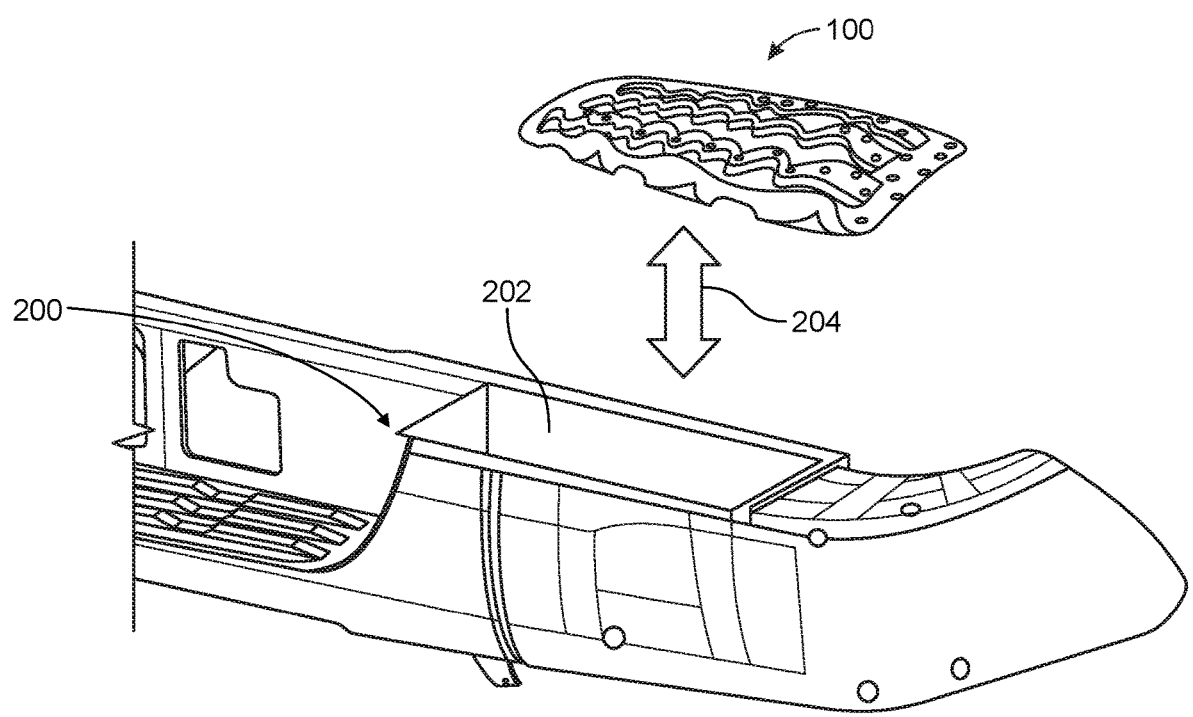
FIG. 2A illustrates an example implementation of an integrated, removable traction device (in a removed state) in accordance with one embodiment.

FIG. 2A illustrates usage of traction device 100, where in this scenario, traction device is separated from a vehicle bumper 200. Arrow 204 illustrates how a user may lift/remove traction device 100 from bumper 200 or lower/set traction device into/atop bumper 200. In some embodiments, an aperture or cavity 202 may be provided in bumper 200 to accept traction device 100. The depth, size, shape of cavity 202 can vary to accommodate different sizes/shapes of traction device 100. In other embodiments, cavity 202 may be used for additional storage, where traction device 100 acts as a cover for cavity 202. In still other embodiments, bumper 200 may not include a cavity (not shown), but rather merely an area or surface (or more shallow cavity) atop which or over which, traction device 100 may be placed/stored.

As illustrated in FIG. 2A, the shape of cavity 200 substantially matches or corresponds to the shape (more particularly the outer boundary/footprint) of traction device 100. However, in other embodiments, the shape of cavity 202 may not necessarily correspond to that of traction device 100. For example, cavity 202 may be larger than traction device 100, where traction device 100 covers a portion of cavity 202, and the remainder of cavity 202 may be closed with another type of cover. In some embodiments, cavity 202 may accommodate multiple traction devices. In some embodiments, multiple areas or section of bumper 200 may be used for the integration of multiple traction devices. In some embodiments, the boundary of cavity 202 may be smaller than the footprint of traction device 100.

In some embodiments, as noted above, vehicle bumper 200 may be a rear vehicle bumper, although other embodiments are not necessarily limited to integration with a rear vehicle bumper. In some embodiments (not shown), traction device 100 may be similarly, removably integrated into or as part of a tailgate of a truck or SUV, for example, rather than in or atop a bumper.

Figure 2B:
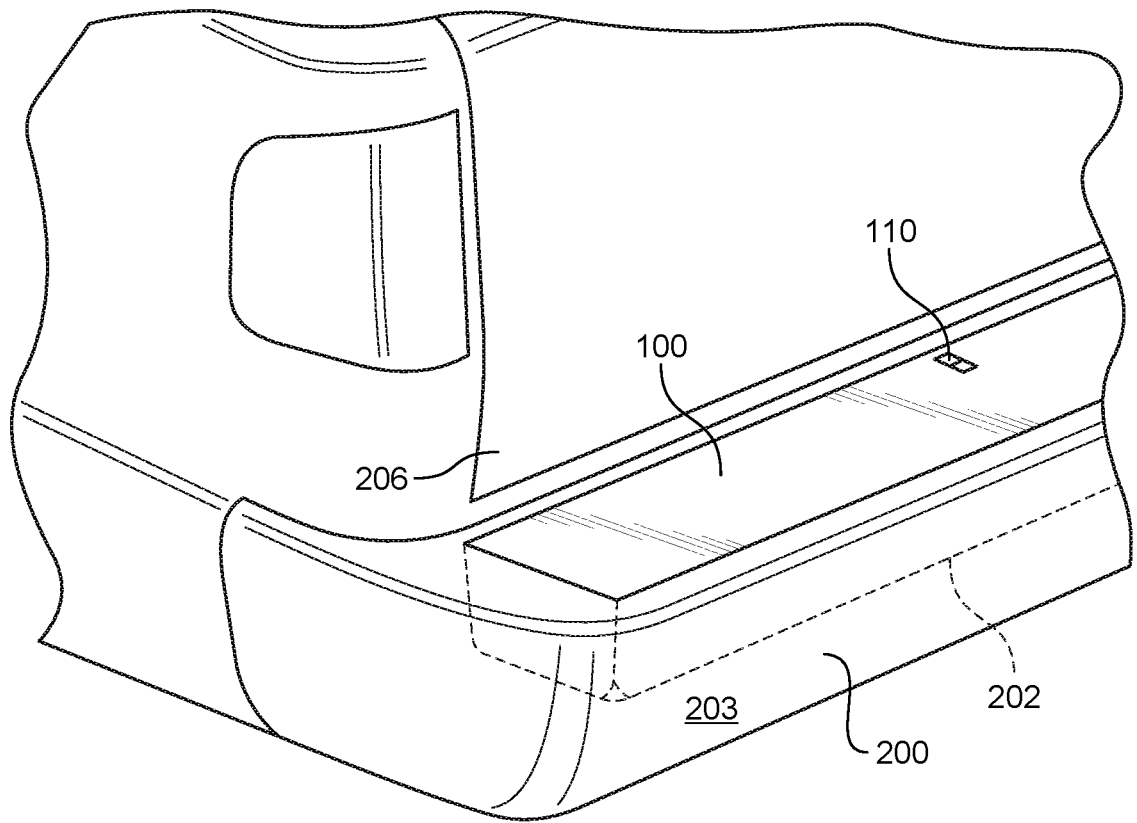
FIG. 2B illustrates the example implementation of the integrated, removable traction device of FIG. 2A (in a stowed state) in accordance with one embodiment.

FIG. 2B illustrates traction device 100 in a stowed state. As illustrated in FIG. 2B, traction device 100 may rest, in this embodiment, at least partially within cavity 202 or covering cavity 202 of bumper 200. One embodiment of attachment mechanism 110 may be provided in the form of a actuatable latch. For example, a user may lift or pry open attachment mechanism 110 to disengage attachment mechanism 110 from a corresponding catch or locking element (not shown). In some embodiments, attachment mechanism 110 may latch onto a surface(s) of bumper 200 or cavity 202 to effectuate locking or securing of traction device 100.

It should be understood that a typical bumper structure may include a lower back panel (not shown) that is connected to or part of the frame of the vehicle, while a bumper cover 203 is operatively attached to the lower back panel to effectuate bumper 200. It should be understood that a gap between the lower back panel and bumper cover 203 provides a space for accommodating storage cavity 202. It should be understood that other elements, such as shock absorbers, may be disposed between the lower back panel and bumper cover 203. Storage cavity 202 can be adapted to avoid interference with such elements.

Again, the present disclosure contemplates various different embodiments of traction devices. In this example, FIG. 2B, traction device 100 is configured to rest flush with a top surface of bumper 200. In this way, the operation of tailgate 206 is not affected. In other embodiments, traction device 100 need not necessarily rest flush with bumper 200. For example, traction device 100 may, in some embodiments, be raised above (although preferably to an extent such that operation of tailgate 206 is not affected) or embedded further into cavity 202. In some embodiments, when in a stowed position, traction device 100 may act as a footstep, and may provide increased traction for a user if/when the user needs to climb onto bumper 200 (e.g., to reach a roof rack (not shown), step into a truck). In the case of a truck, traction device 100, when stowed in bumper 200, may be used as a step-up to reach the bed of the truck. That is, traction device 100 may have multiple uses, even when stowed or in a stowed position.

Figure 3A:
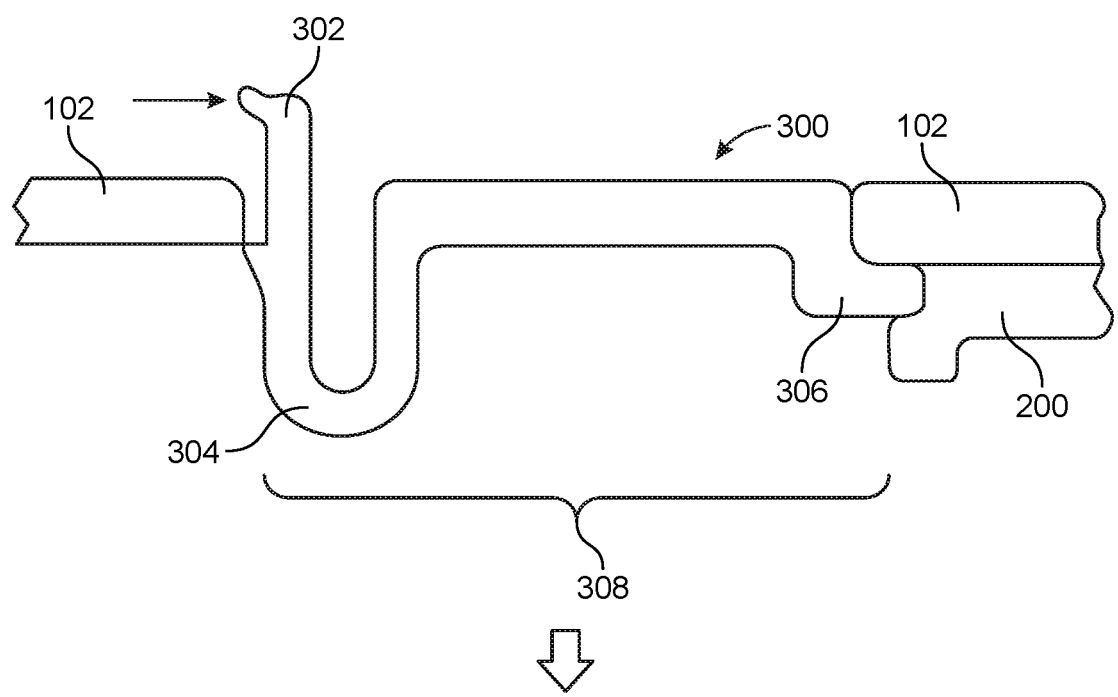
FIGS. 3A-3D illustrate use of an attachment or locking mechanism for an integrated, removable traction device in accordance with one embodiment.

FIGS. 3A-3D illustrate one contemplated embodiment of an attachment mechanism for traction device 100 in the form of an actuatable latch 300. For ease of representation, cutaway views are provided in FIGS. 3A-3D. FIG. 3A illustrates an example of traction device 100 (in particular, portions of platform 102 of traction device 100). When traction device 100 is secured to bumper 200, actuatable latch 300 may engage one or more portions of bumper configured to accept one or more portions of actuatable latch 300. In particular, a first portion of actuatable latch 300 may include a flexible/bendable U-shaped arm 304 ending, at a first end, in a latch portion 302 that can engage a bottom/under surface of platform 102 of traction device 100. At another, second end 306 (distal from the first end), the U-shaped arm 304 of actuatable latch 300 may extend/span the width of attachment cavity 308. The second end 306 may be configured or shaped to also engage a portion of the meeting point between bumper 200 and platform 102 of traction device 100.

Figure 3B:
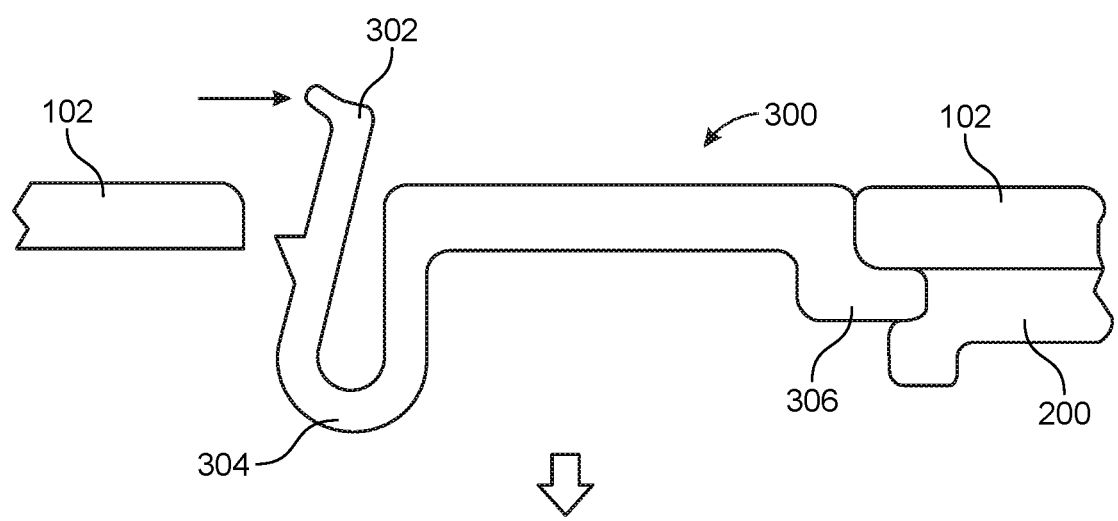

FIG. 3B illustrates a progression of disengaging actuatable latch 300 to release platform 102 of traction device 100 from bumper 200. As can be appreciated from FIG. 3B. a user may push against or actuate the first end/latch portion 302 of actuatable latch 300. This actuation results in U-shaped arm 304 bending/compressing such that latch portion 302 disengages from platform 102 of traction device 100.

Figure 3C:
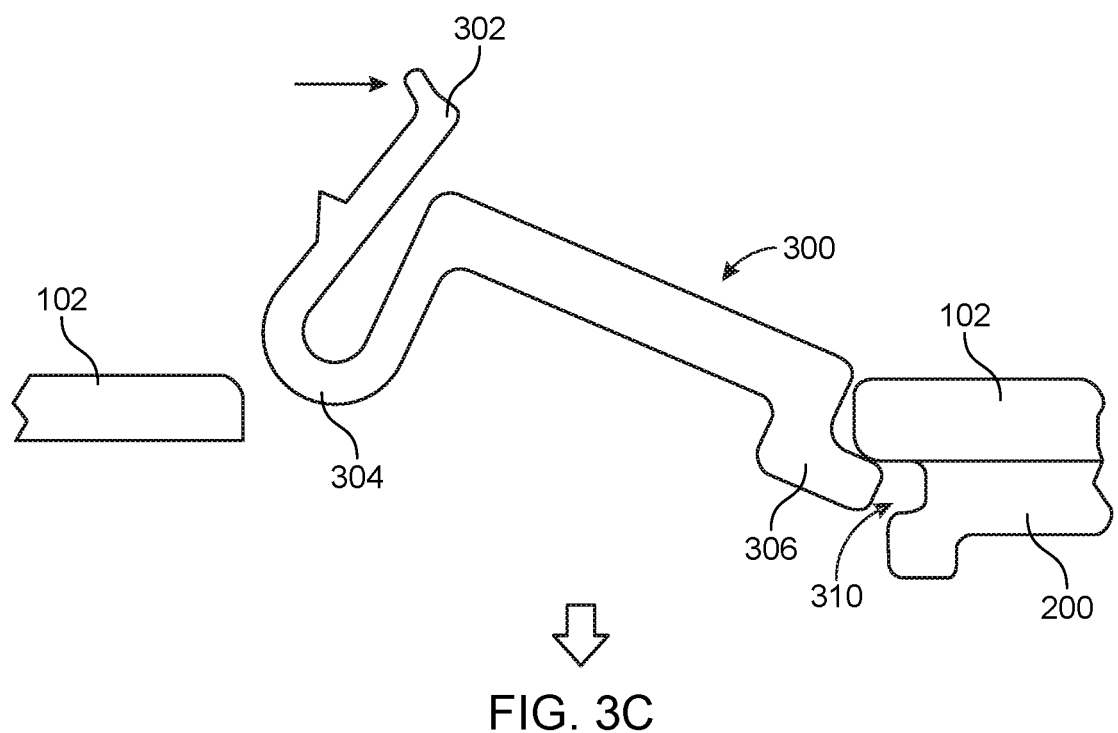

As illustrated in FIG. 3C, when released from a first portion/section of platform 102 of traction device 100, actuatable latch 300 may be tilted/lifted out of attachment cavity 308. This in turn, allows the second end 306 to also disengage/release from bumper 200/platform 102 of traction device 100.

Figure 3D:
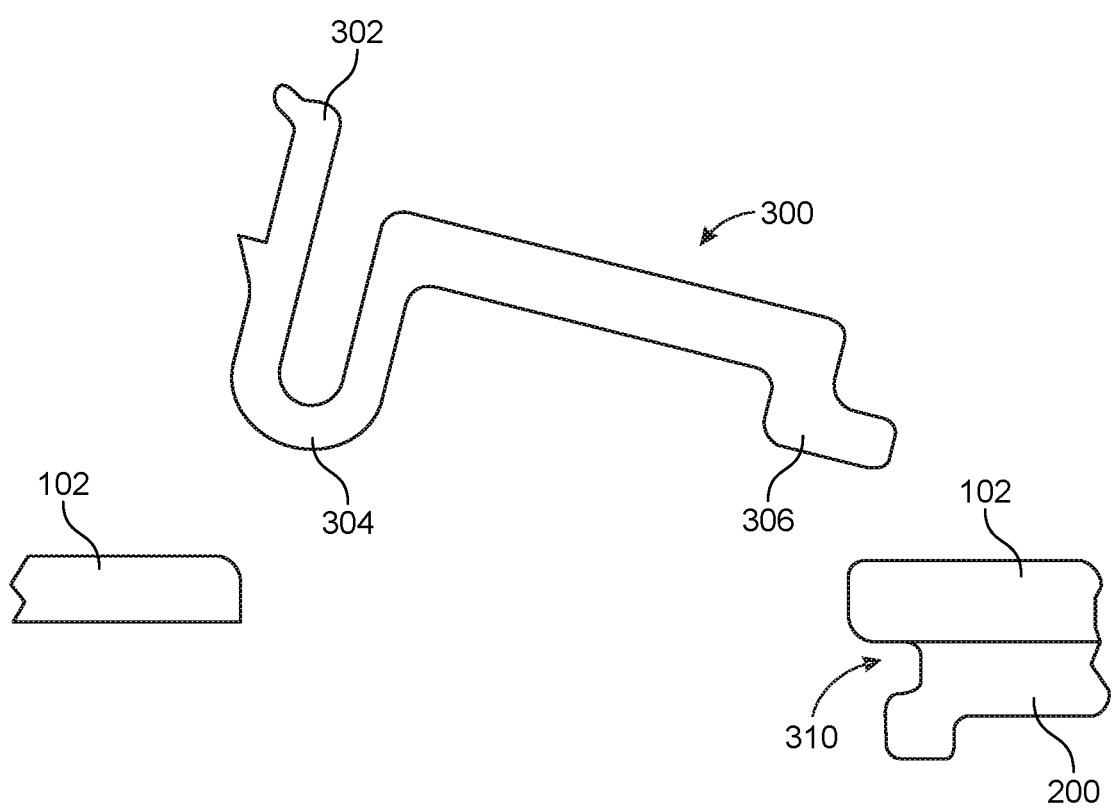

As illustrated in FIG. 3D, upon completely disengage first and second ends 302, 306 of actuatable latch 300 from platform 302/bumper 200, actuatable device 300 may be removed completely, allowing traction device 100 to be removed (so long as no other attachment mechanisms are still engaged. As noted above, various attachment mechanisms are contemplated, and FIGS. 3A-3D illustrate just one example of such an attachment mechanism. For example, one or more instances of actuatable latch 300 may incorporate a locking mechanism (not shown) to provide additional security for any cargo stored in bumper 200 or to prevent removal of traction device 100 from bumper 200.

Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common s elements. Such a description shall not require or imply that separate components are used to implement such features or functionality.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A vehicle, comprising:
    a bumper; and
    a traction device integrated into the bumper, wherein the traction device is stowable in the bumper and removable from the bumper, wherein an attachment mechanism operatively connects the traction device to the bumper, the attachment mechanism adapted to retain the traction device within the bumper when stowed, and release the traction device from the bumper for use in providing traction to the vehicle, and wherein the attachment mechanism comprises a latch having first and second ends distal from each other, the first end engaging with at least one of a surface of the traction device and a surface of the bumper, the second end engaging with at least one of a surface of the traction device and a surface of the bumper.

2. The vehicle of claim 1, wherein the bumper comprises a rear bumper of the vehicle.

3. The vehicle of claim 1, wherein the bumper comprises a storage cavity.

4. The vehicle of claim 3, wherein the traction device operates as a cover to the storage cavity when the traction device is stowed.

5. A bumper, comprising:
   a lower back panel of a vehicle; and
   a bumper cover operatively connected to the lower back panel, wherein a space between the bumper cover and the lower back panel comprises at least a portion of storage cavity, the cavity being covered by an integrated, removable traction device stored on the bumper;
   wherein an attachment mechanism operatively connects the integrated, removable traction device to the bumper, the attachment mechanism adapted to retain the integrated, removable traction device within or atop the bumper cover when stowed, and release the traction device from the bumper cover for use in providing traction to the vehicle, the attachment mechanism comprising a latch having first and second ends distal from each other, the first end engaging with at least one of a surface of the traction device and a surface of the bumper, the second end engaging with at least one of a surface of the traction device and a surface of the bumper.

* * * * *